Oct. 7, 1969 P. M. HAWKINS 3,471,188

SECURITY SYSTEM

Filed Nov. 25, 1966 7 Sheets-Sheet 1

INVENTOR
PAUL MADDISON HAWKINS

BY

Ward, Haselton, McElhannon, Orme, Brooks & Fitzpatrick
ATTORNEYS

INVENTOR.
PAUL MADDISON HAWKINS
BY
Ward, Haselton, McElhannon, Orme, Brooks & Fitzpatrick
ATTORNEYS INVENTOR.
PAUL MADDISON HAWKINS
BY
Ward, Haselton, McElhannon, Orme, Brooks & Fitzpatrick
ATTORNEYS INVENTOR.
PAUL MADDISON HAWKINS
BY
Ward, Haselton, McElhannon, Orme, Brooks & Fitzpatrick
ATTORNEYS Oct. 7, 1969 P. M. HAWKINS 3,471,188

SECURITY SYSTEM

Filed Nov. 25, 1966 7 Sheets-Sheet 5

PAUL MADDISON HAWKINS

Ward, Haselton, McElhannon, Orme, Brooks & Fitzpatrick
ATTORNEYS

INVENTOR.
PAUL MADDISON HAWKINS
BY
Ward, Haselton, McElhannon, Orme, Brooks & Fitzpatrick
ATTORNEYS INVENTOR.
PAUL MADDISON HAWKINS
BY
Ward, Haselton, McElhannon, Orme, Brooks & Fitzpatrick
ATTORNEYS

United States Patent Office 3,471,188
Patented Oct. 7, 1969

3,471,188
SECURITY SYSTEM

Paul Maddison Hawkins, Jericho, N.Y., assignor to General Alarm Corporation, New York, N.Y., a corporation of Delaware Filed Nov. 25, 1966, Ser. No. 596,841
Int. Cl. E05c *1/06, 17/36, 1/12*
U.S. Cl. 292—140 18 Claims

ABSTRACT OF THE DISCLOSURE

A security system for a closure including a retracting bolt mounted in lateral movement upon application of a predetermined lateral force, an alarm circuit actuating switch normally in circuit disabling condition but operable to energize the circuit upon lateral movement of the bolt; a chain lock operable also to move the switch to circuit energizing condition upon exertion of a predetermined force applied to the chain; means for preventing retraction of the bolt under any condition, and means for disabling the outside knob.

This invention relates to security systems, and more particularly, to improved means for securing premises against unauthorized entry and for actuating an alarm upon attempted unauthorized entry.

Those persons skilled in the art are aware of the constant and continuing efforts to improve security of persons and property, as well as the fact that while numerous improvements have been made over the years, a satisfactory measure of security has not yet been achieved.

Thus, the present invention contemplates the provision of an improved security alarm system to the end that individuals may economically afford themselves and their premises adequate protection against unauthorized entry and may provide warning of attempted entry by unauthorized means before entry is achieved.

The present invention is described herein, by way of example, in connection with a lock mechanism that may include a plurality of cams able to bear respectively against a part integral with the bolt to retract same upon rotation of conventional inner and outer door knobs and a key operated locking device such as a pin tumbler cylinder, for example, against the force of means such as a spring urging the bolt to projected position. The knob controlled cams may have flat-sided grooves and the knobs may be equipped with flat-sided shafts that fit into the grooves so that rotation of the knobs effects rotation of the corresponding cams, the key-operated cam is positioned between the knob-operated cams and has a square hole that is engaged by a square shaft extending from the key controlled locking device through a bore in the outside knob cam operating shaft.

As a feature of the present invention, there is provided in apparatus of the class described having a bolt member mounted for reciprocating movement between projected and retracted positions, means supporting the bolt for lateral movement upon the application of a predetermined lateral force to the bolt member, means urging the bolt member into projected position, and means for retracting the bolt member; mounting means supporting the bolt member for lateral movement relatively to the frame member upon the application of a predetermined lateral force to the bolt member, a normally closed circuit-activating switch, and switch closing means effective to close the switch upon lateral movement of the bolt member. The switch may be fixedly mounted relatively to either the bolt member or the frame member and the switch closing means is mounted on the other member.

In one embodiment, the frame may include a face plate arranged to be mounted, say mortise fashion, in a door, for example. The frame is recessed for reception of a second plate which shifts with the bolt upon the application of the lateral force, the second plate being retained in the recess by spring means that determine the lateral load needed to shift the bolt relatively to the frame. The seat of the recess in the face plate serves as a fulcrum for the second plate seated therein when a lateral force of sufficient magnitude is applied.

As another feature of the invention, there is provided a manually operable control member, such as a turn button, preferably adjacent the inside knob, and means associated with that member for disabling the outside knob. Thus, from inside the premises, the outside knob may be rendered inoperable so that only an authorized key may be used from outside the premises to gain entry. The means associated with the control member actually is shiftable between positions to enagge or disengage the outside knob cam operating shaft to disable or release same. The shaft may be flat-sided and the aforementioned means may be contoured to engage the flat sides of the shaft to hold same against rotation, and to shift to a position wherein the shaft is disengaged.

Additionally, the present invention contemplates a total security measure for conditions as when the entire family is at home for the night. According to this concept, the bolt may not be retracted at all. Thus, when total security in in effect, unlocking may not be achieved even by an authorized key. For this purpose, the bolt may be recessed and manually operable means may be provided such as a shaft depressible from the inner side of the door to enter the recess when the bolt is projected to revent retraction of same.

An important feature of this invention contemplates the combination with those aspects of the system already described of a chain lock that enables the door to be partially opened but will actuate the alarm if excessive pressure is exerted on the door while in partially opened, chained condition. Thus, the chain may be releasably secured at one end to means engaging the bolt, and may be anchored at the other end so that upon excessive lateral force exerted upon the chain, the same tilting action occurs which activates the switch when an excessive lateral force is exerted upon the projected bolt. Means may be provided for anchoring one end of the chain at selected positions along its length. For example, the anchor may include a guide such as a tube through which the chain passes as the door swings ajar, and upstanding tooth-like members are positioned to engage links of the chain, when the latter is bent in a particular way, to anchor same against further movement through the tube. Preferably, the upstanding members are four in number and positioned at corners of an imaginary square, or 90° apart, so that the chain can be anchored by bending it in any direction at the guide entrance.

In accordance with the present concept, the bolt is rectilinear in configuration; that is, it does not have the usual inclined surface or ramp which strikes against a keeper or striker and cams the bolt to retracted position as the door closes. Instead, the keeper or bolt receiving means is formed with a ramp to cam the bolt. This makes it impossible to manipulate the bolt by inserting a flat stiff member between door and jamb and camming same to retracted position. Thus, the need for the conventional deadbolt is obviated.

The bolt will usually be mounted in a door and the keeper or bolt receiving means in a jamb or door frame. In one embodiment of the present invention, there are provided means for releasing the bolt receiving means from the member in which it is normally mounted; and in this case, the chain will be attached at one end to the bolt receiving means so that any excessive lateral loading on the chain will be transferred through the bolt receiving means to the bolt to tilt the same and activate an alarm switch. The release means may comprise a manually operable latch biased to position normally to retain the bolt receiving means in stationary position in the door jamb. Additionally, the bolt may be equipped with a locking cam that positively locks the bolt and keeper or bolt receiving means together when the bolt is projected, but which is cammed to disengage the bolt receiving means when the bolt is retracted as by rotation of the knobs or lock cylinder.

There has thus been outlined rather broadly the more important features of the invention in order that the detailed description thereof that follows may be better understood, and in order that the present contribution to the art may be better appreciated. There are of course additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification, wherein.

Figure 1:
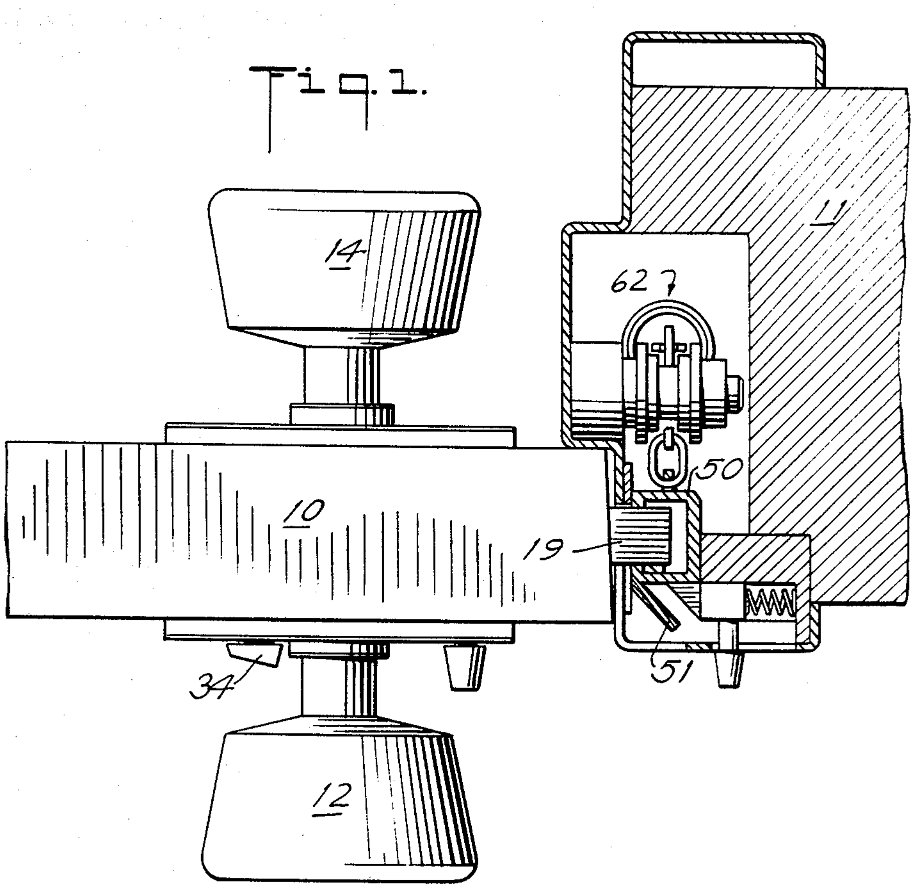
FIG. 1 is a top plan view of one embodiment of the present invention illustrating certain features thereof with the door in closed position.

Referring now to the drawings, and more particularly to FIGS. 1 to 8, there is shown an embodiment of the present invention for use in connection with a door 10 and a door jamb 11 to which the door may be locked against movement.

The security system includes a lock-set comprising inner and outer knobs 12 and 14, respectively, the latter of which may be a key-in-the-knob type, a frame 15 mounted mortise fashion in the door 10 and having an opening 16 at the door's edge. A suitable end plate 17 is secured as by screws to the frame and to the door, as clearly shown in FIG. 3.

The frame 15 supports a bolt 19 for reciprocating movement between projected and retracted positions relatively to the door, and also supports a pair of springs 20 (FIGS. 3, 4 and 5) that bear against the rear of the bolt and urge same to projected position.

Figures 2, 8:
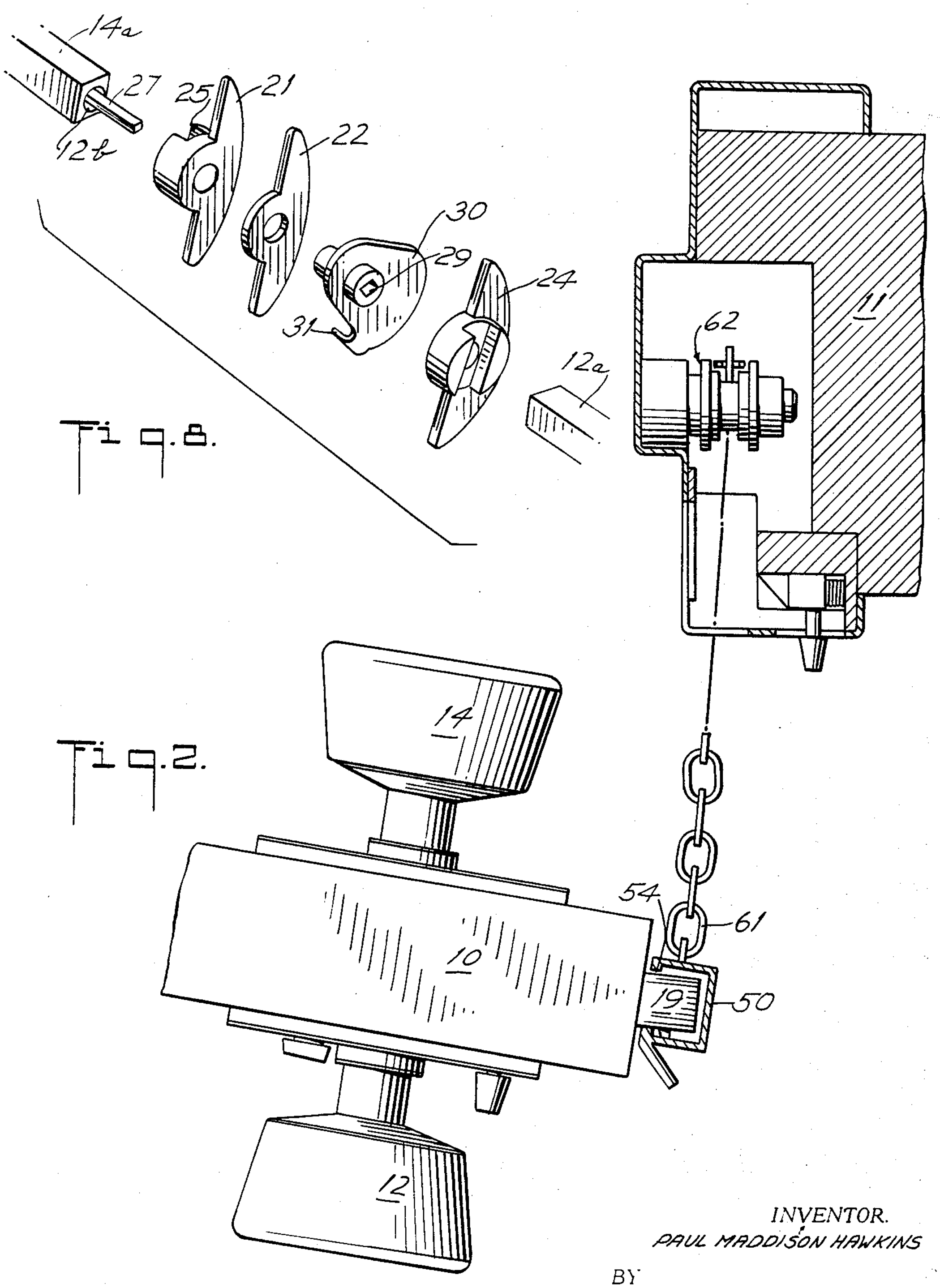
FIG. 2 is a view similar to that of FIG. 1 but showing the door in open position.
FIG. 8 is an exploded view illustrating certain details of structure of the apparatus.
Figure 3:
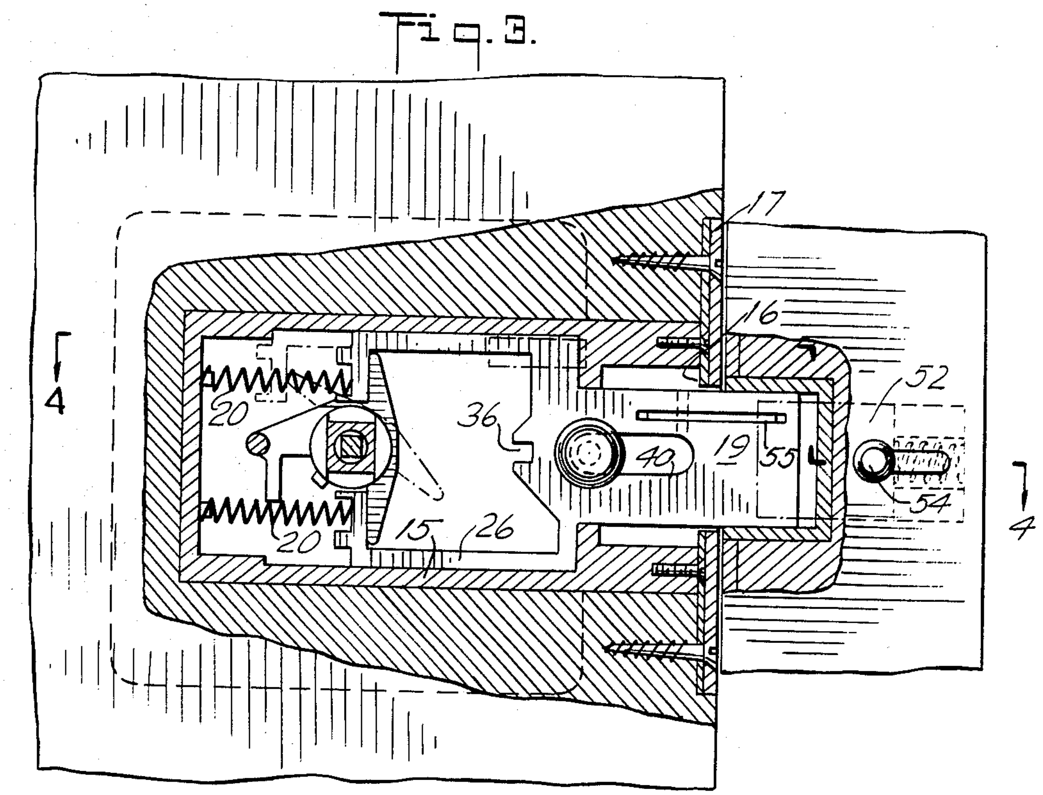
FIG. 3 is a vertical cross-sectional view of the apparatus of FIGS. 1 and 2.
Figure 4:
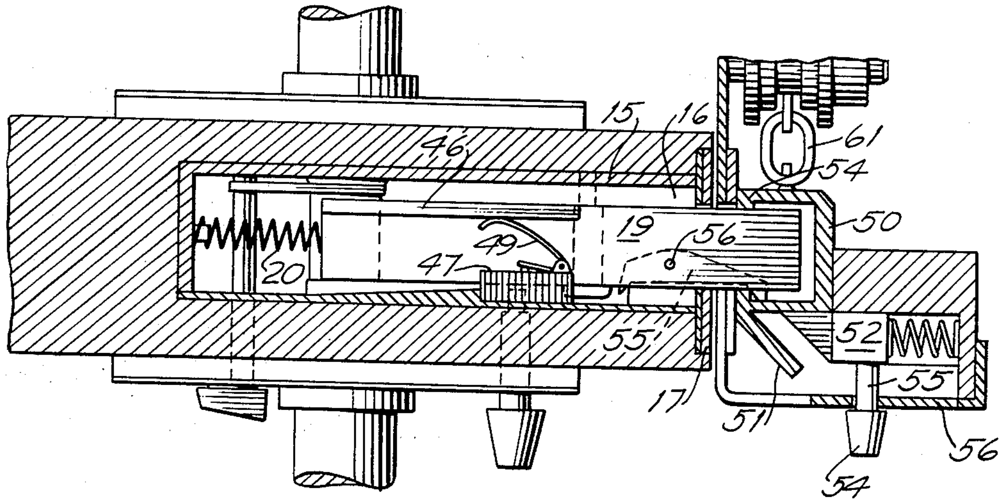
FIG. 4 is a cross-sectional view taken along the lines 4—4 of FIG. 3.
Figure 7:
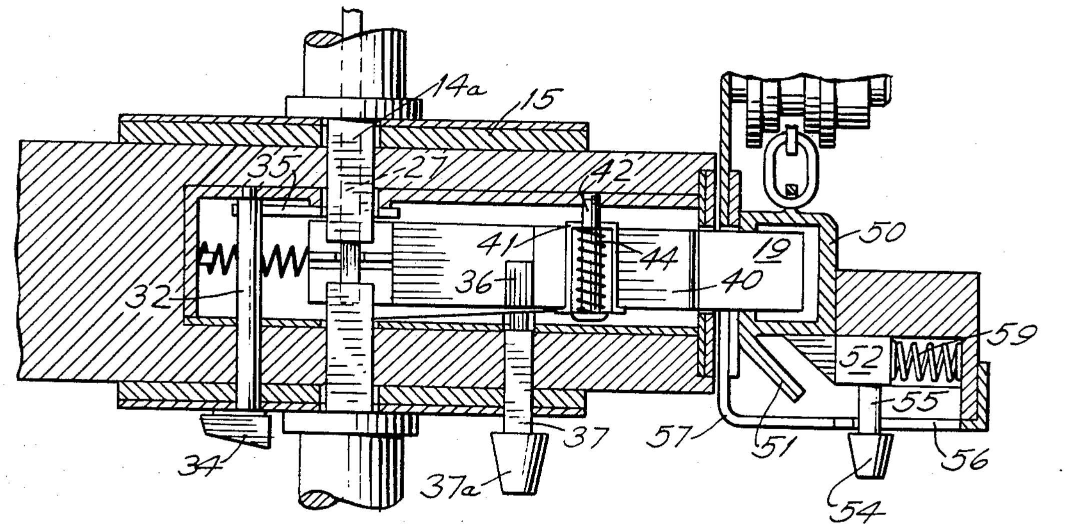
FIG. 7 is a cross-sectional view taken along the lines 7—7 of FIG. 6.
Figure 9:
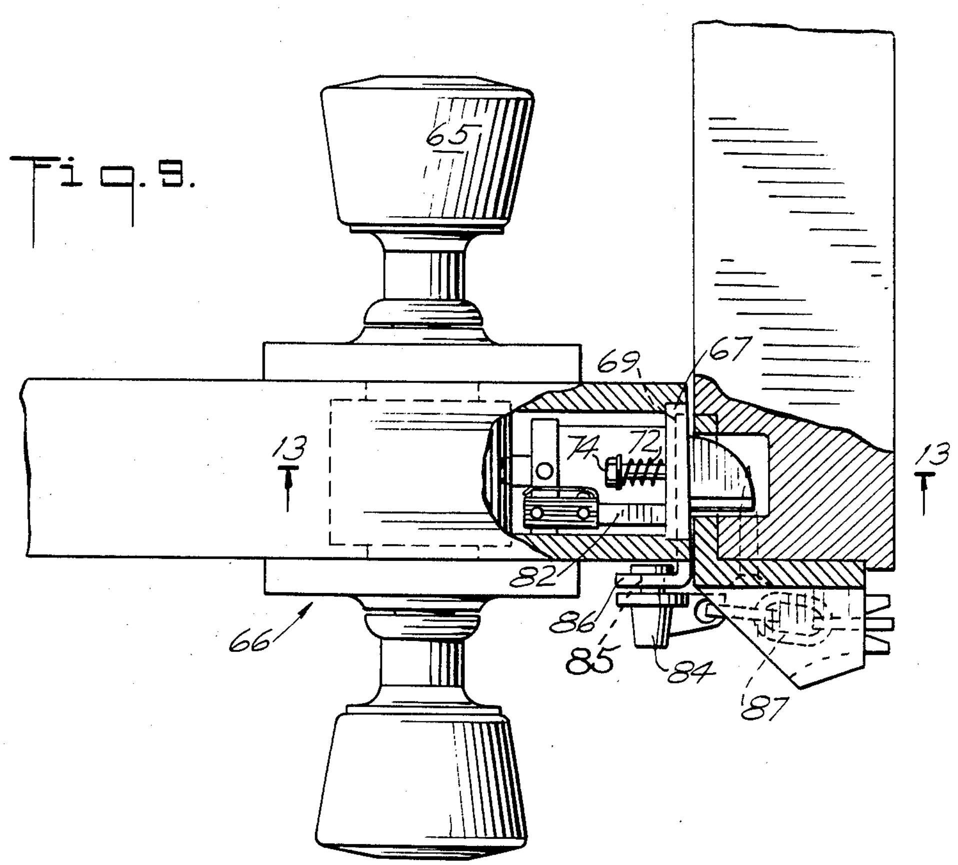
FIG. 9 is a partial horizontal sectional view of a further embodiment of the invention showing the door in closed position.

As best shown in FIGS. 3, 7 and 8, a series of winged cams 21, 22 and 24 are operable to retract the bolt 19 by rotation of the outer knob, the key operated cylinder or the inner knob, respectively. Thus, the outer knob cam 21 has a flat-sided groove 25 that receives the closely fitting square shank **14*a* of the outer knob 14 so that the cam 21 rotates with that knob. The cams are positioned within an opening (FIG. 3) formed in a bolt extension 26 so that the cam wings bear against opposed surfaces of the bolt extension 26, wherefore rotation of either cam will retract the bolt against the force of springs 20. Cam 24 is similarly constructed and arranged in relation to the inner knob 12 and its square shank 12*a***.

The outer knob shank **12*a* has a longitudinal bore 12*b* extending therethrough and a smaller square shank 27, rotatable by a key cylinder for example, projects through the bore 12*b*, central openings in cams 21 and 22 and fits closely into a square hole 29 of segment 30 positioned between cams 22 and 24 and provided with a tab 31 that engages a wing of cam 22** to urge it into bolt retracting movement when the key cylinder is rotated in a particular direction.

Figure 6:
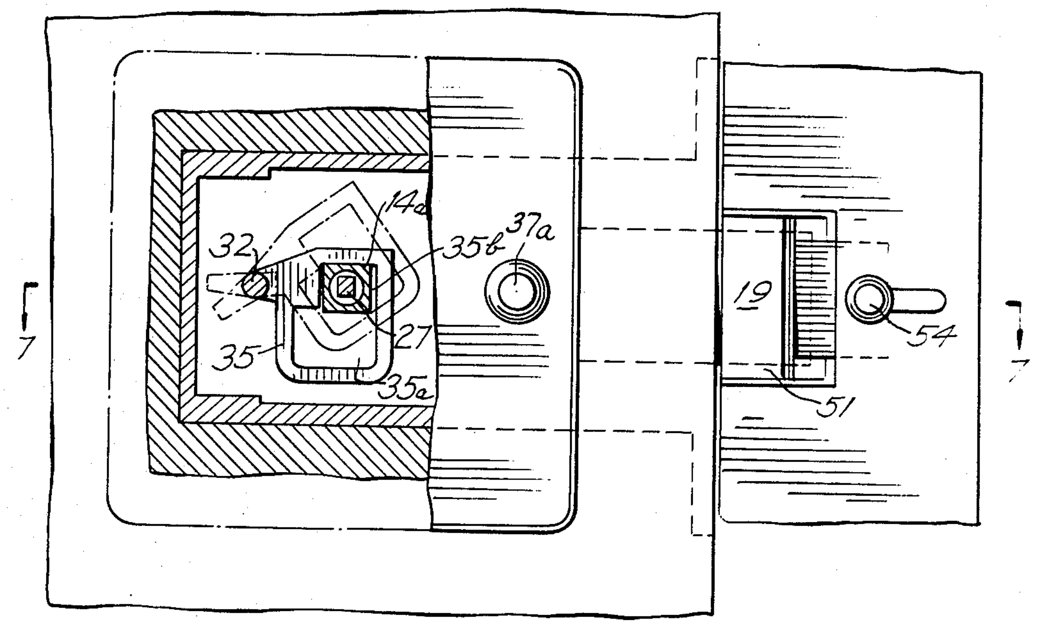
FIG. 6 is a cross-sectional view taken along the lines 6—6 of FIG. 5.

Turning now to FIGS. 6 and 7, there is shown a shaft 32 extending across the frame 15 in which it is mounted for rotation by a turn button 34 accessible from adjacent the inner knob 12. Secured to the shaft 32 for rotation therewith is a shank lock 35 comprising a rigid member formed with an opening having a large zone **35*a* and a smaller zone 35*b* opening into each other and so positioned that when the shaft 32, and therefore the shank lock 35, are disposed as shown relatively to the shank 14*a* of the outer knob, the sides of the smaller zone 35*b* closely fit around three sides of that shank and prevent its rotation so that the outer knob is positively disabled and bolt retraction can only be effected by rotation of the key cylinder controlled shank 27 (FIG. 8). Upon rotation of the turn button 34 and shaft 32 counterclockwise, as viewed in FIG. 6, the shank lock 35 rocks to a position wherein the shank 14*a* is surrounded by the larger zone 35*a* of member 35 and is free to rotate thus giving bolt control to the knob 14**.

As has been stated, the present invention contemplates a total security measure according to which the bolt may not be retracted at all, even by an authorized key. For this purpose, and still referring to FIGS. 6 and 7, the bolt 19 is formed with a horizontally extending lateral groove 36 (FIG. 3) that opens into the opening in the bolt extension 26. A reciprocable pin 37 is controlled by a manual depress button **37*a* adjacent the inner knob 12 and extends into the frame 15 in a manner to permit it to be positioned in the groove 36 or withdrawn therefrom. It will be appreciated that so long as the pin extends into the groove, the bolt cannot be retracted by any means. Thus, when total security is desired, as when a family is retiring for the night and no arrivals are expected, total security is available merely by depressing the button 37*a***. A would-be intruder with a stolen or duplicate key cannot then gain entrance.

It has been mentioned that the present concept embraces means warning of attempted unauthorized entry. To this end, the bolt 19, while reciprocable in the frame 15, is also tiltable laterally when a predetermined lateral force is applied to it as by forcing it against its keeper when the door is latched, as by exertion of a force against the ouside of the door.

To permit this action, the bolt 19 is longitudinally slotted as at 40 (FIGS. 3 and 7) and a spring cup 41 carried by bolt 42 extends through the slot and is flanged at its open end to overlie the side of the bolt 19. The bolt 42 is threaded into the frame 15 as shown so that this sub-assembly is stationary. A spring 44 bears between the base of the cup and the bolt head for a purpose to be described, and the bolt 19 is of course free to move between retracted and projected positions without interference from the cup or bolt 42.

Figure 5:
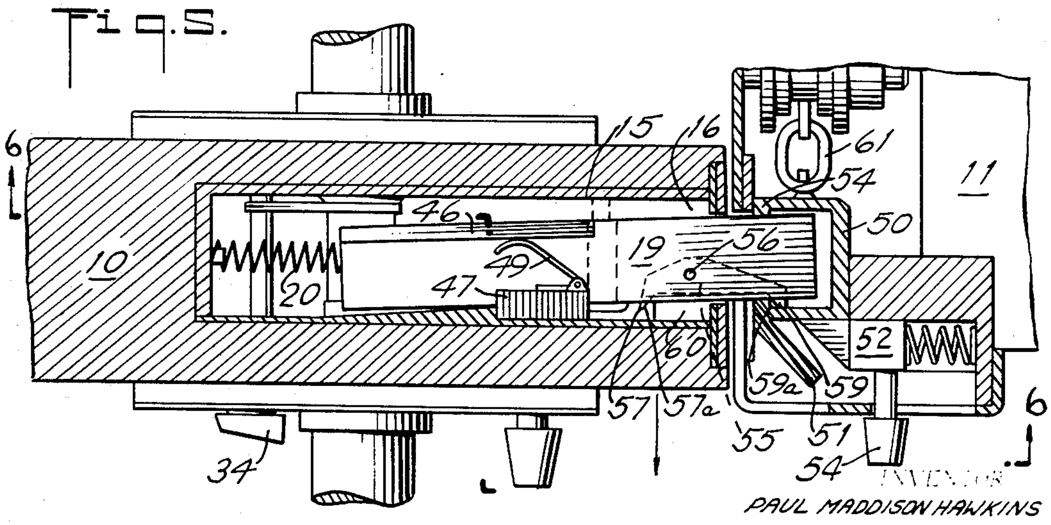
FIG. 5 is a horizontal cross-sectional view of the apparatus.

Referring now to FIG. 5, it will be noted that upon the application of a force of sufficient magnitude in the direction of the arrow, i.e. inwardly, the bolt 19 fulcrumed by its keeper, tilts against the force of the spring 44, which can be adjusted by rotation of the bolt 42 to preset the amount of force required to tilt bolt 19. The bolt 19 is provided with an upstanding flange 46 (FIGS. 4 and 5) positioned in respect of a normally open alarm circuit control switch 47 mounted in the frame 15 to deflect the control spring arm 49 of the switch to shift same from its normal position (FIG. 4) to its closed, circuit activating position (FIG. 5).

It will be recalled that an important feature of the present invention contemplates the combination with those aspects of the system already described of a chain lock that enables the door to be partially opened but will activate the alarm if excessive pressure is exerted on the door while in partially opened chained condition. For this purpose, and as seen in FIGS. 1 to 3, a keeper or bolt receiving means 50 is releasably mounted in the door jamb 11 in a position to receive the projected bolt 19 when the door 10 is closed. This receiving means 50 may take the form of a cube opened at one side with an integral ramp 51 extending angularly inwardly and away from the door. As stated, the bolt 19 is rectilinear in configuration and does not have the usual chamfered surface, the ramp 51 serving instead to cam the bolt towards retracted position as the door is closed. A latch 52 is mounted in the jamb and serves to secure the receiving means 50 in place; but a manually engageable button 54 is connected to the end of a rod 55 integral with the latch 52 and slidable laterally in a slot 56 formed in a mounting member 57, against the force of spring 59 which urges the latch to projected position, as shown.

Thus, the door may be opened without retraction of the bolt 19 merely by retracting the latch 52, in which case, the receiving means or keeper 50 is free to swing away from the jamb 11 along with the door 10. Actually, the bolt receiving opening of the keeper 50 is reduced by a short inturned peripheral flange 54 which engages the bolt 19, and a locking cam 55 (FIGS. 4 and 5) is mounted in the bolt 19 for pivotal movement about a vetrical pin 56. This cam 55 has a pointed projection 57 formed with a ramp **57*a* on its inner end and a tab 59 formed with a ramp 59*a* on its outer end. As the bolt 19 moves toward projected position, the ramp 57*a* engages a block 60 within the frame 15 and is shifted clockwise, as viewed, about the pin 56 to project the tab 59 which will have entered the keeper 50 and passed the inturned flange 54 thereof wherefore the bolt 19 and keeper 50 are positively locked together against separation. Upon retraction of the bolt 19, the ramp 57*a* moves away from the block 60 and the ramp 57*a* is lifted by the flange 54 of the keeper 50 to pivot the cam 55 counterclockwise to release the bolt 19** from the keeper.

As has already been mentioned, the door can be opened without retracting bolt 19 by shifting the latch 52 to the right, as viewed, to release the keeper 50 from the jamb. However, a chain 61 is attached at one end to the keeper 50 and extends through chain anchor means 62 about which more will later be said. For the present, suffice it to say that a member is attached to the remote end of the chain which is too large to pass through the anchor means so that when the door is opened by releasing the keeper 50, it can only be opened to an extent dictated by the length of the chain.

Figure 12:
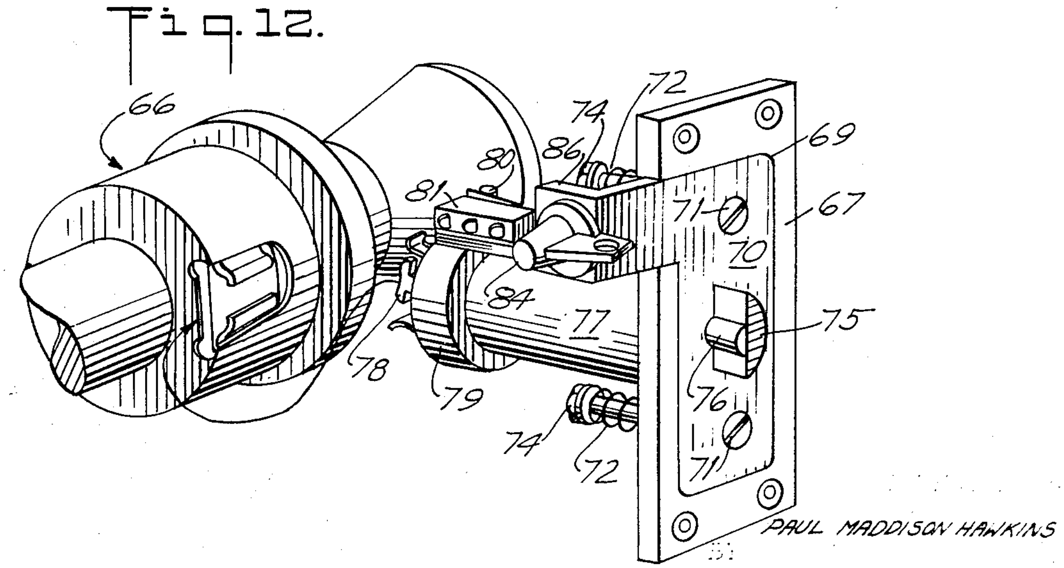
FIG. 12 is a detail view illustrating the relationship of the present invention to an ordinary lock-set.

Turning now to FIGS. 9 to 13, there is shown another embodiment of the invention according to which the inside and outside knobs 64 and 65, respectively, are part of a conventional lockset designated generally by the numeral 66. In this case, a face plate 67 is secured to the door edge and is formed with a recess 69 in which a second plate 70 is mounted, as best shown in FIG. 12. A pair of bolts 71 seated in plate 70 pass through the face plate 67 and support springs 72 acting against the rear of the face plate and nuts 74 threaded on to the bolt ends. The door bolt 75, in this case shown with a dead bolt 76, passes through the face plate 67 and the second plate 70 when projected. The rear of the bolt has T-connections 78 which engage retracting mechanism of the lockset 62 in the conventional way.

The portion of the bolt 75 behind the face plate 67 is surrounded by a barrel 77 at the end of which is a collar 79 to which is connected an upstanding pin 80; and a normally open switch 81, such as a micro-switch, is mounted on an arm 82 (FIGS. 9 and 10) rigidly carried by the face plate 67. Actually, the switch 81 is so positioned that lateral tilting of the bolt 75 against the force of springs 72, as by pressure exerted against the exterior of the door, will cause the pin 80 to press the switch arm and close the switch thus to activate an alarm circuit which may, for example, include a speaker 83 located in the inside door (FIG. 11), in the inside door knob (not shown) or remote from the door. The nuts 74 at the inner ends of bolts 71 may be adjusted to set the force in springs 72 so as to preselect the force required to tilt the bolt 75 to switch closing position.

As best shown in FIG. 12, the second plate 70 has an arm extending through a side opening in the recess 69 in face plate 67, and this arm mounts a headed button 84 in a slot 85 formed in a rear extending flange 86 at the end of the arm. A chain 87 is connected at one end to this button 84 and passes through anchor means 88 similar to anchor means 62 before terminating in an enlargement too large to pass through the anchor means. Thus, as long as the button 84 is secured in the slot 85 of flange 86, opening movement of the door 10 is limited by the chain length.

Figures 10, 14, 15:
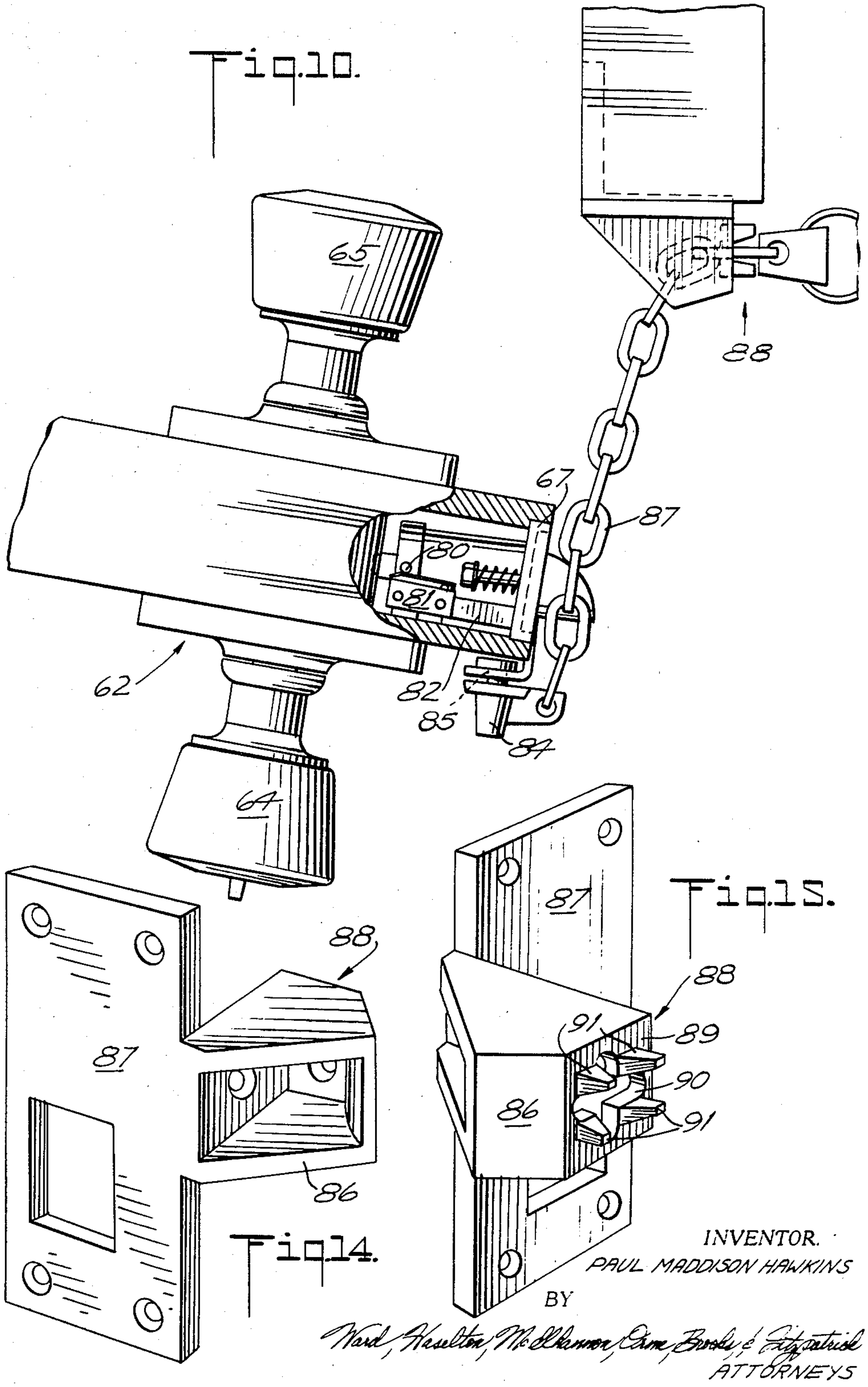
FIG. 10 is similar to FIG. 9, but shows the door partially open.
FIG. 14 is a perspective view illustrating a chain anchor according to the invention.
FIG. 15 is a perspective view further illustrating the chain anchor of FIG. 14.
Figure 11:
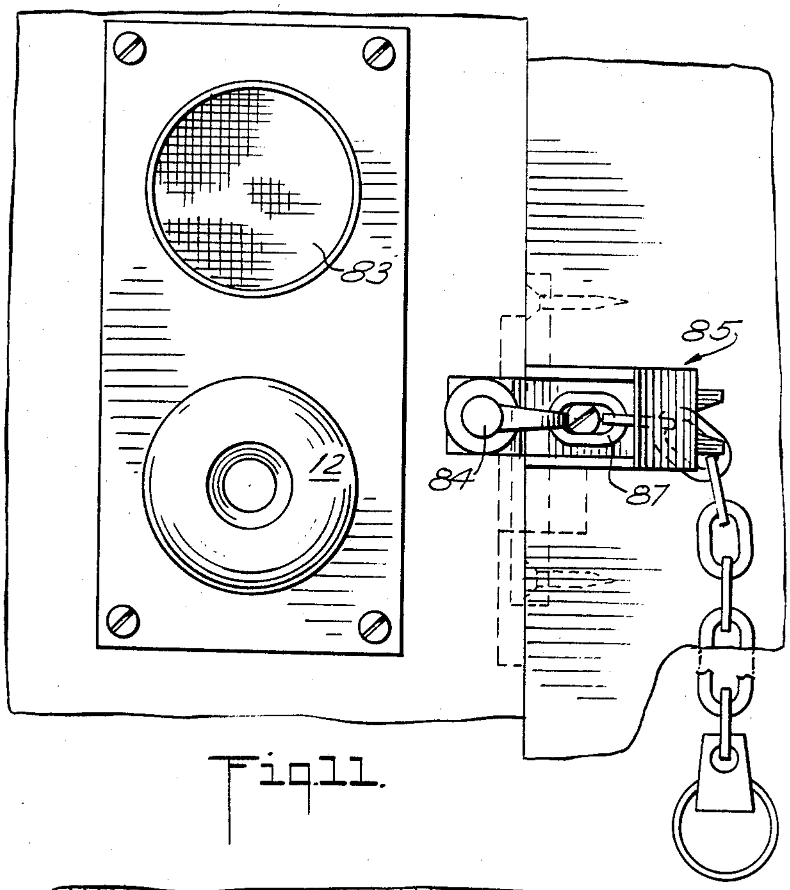
FIG. 11 is an elevational view of the apparatus of FIGS. 9 and 10 from the inside of the door.
Figure 13:
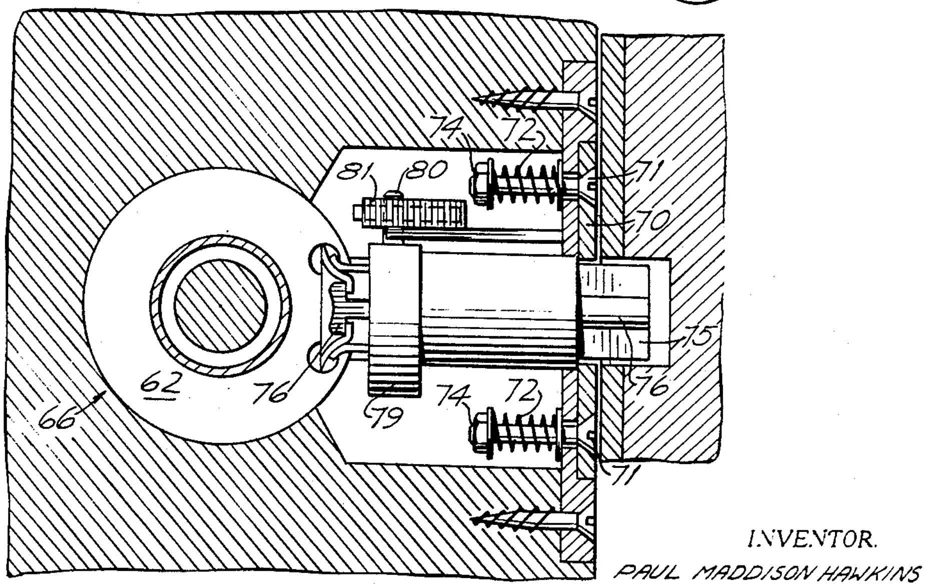
FIG. 13 is a cross-sectional view taken along the lines 13—13 of FIG. 9.

The anchor means 88 shown in FIGS. 14 and 15, takes the form of a tube-like housing 86 integral with a striker plate 87 arranged to be mounted on a door jamb at a level to cooperate with the alarm lockset. The rear of the housing 86 is closed by plate 89 formed with a cross-shaped slot 90 through which the chain links may pass when they approach the plate 89 in a more or less horizontal disposition. As shown, four upstanding projections or teeth 91, integral with the plate 89, are positioned at the corners formed by the intersection of the legs of the slot 90. It will be seen then that as the door is opened while the button 84 is supported on the plate 70 as shown in FIG. 10, and the chain is held in a more or less horizontal position, the limit of movement of the door is determined by the full length of the chain. If, however, the chain is bent in either vertical or horizontal plane, a link will abut two of the teeth 91, depending on the direction in which the chain is shifted, to prevent further movement thereof, and therefore, further movement of the door. The enlarged piece at the end of the chain may be of sufficient weight so that the chain moves freely through the anchor means in the opposite direction as the door is closed. In any case, once movement of the door is opening direction is stopped by cooperation of the chain and anchor means, any further effort to open the door of sufficient magnitude to overcome the force of springs 72 will activate the alarm through switch 81 by tilting the plate 70, barrel 77, collar 79 and pin 80.

From the foregoing description, it will be seen that the present invention provides a system of increased security in that unauthorized entry is rendered exceedingly difficult, if not impossible, and wherein any attempt to force the door will be sensed and will actuate an alarm before the door is actually forced and before an intruder gains entrance; and this, regardless of whether or not the door is fully closed or partially opened on the chain. Additionally, the chain can be employed to control the degree of opening movement of the door. The outside knob may be positively disabled, and, in fact, total security is available by disabling the door bolt against retractive movement under any circumstances. It is also important to note that the usual ramped bolt need not be employed, but rather a ramped keeper may be used so that the need for the usual dead bolt is obviated while affording equivalent protection. It will be understood that while the switch 47 has been referred to as normally open for purposes of convenience, it may be normally closed and shift to open position to actuate an alarm circuit.

It is believed that the novel security system described herein will now be understood and that the present invention will be fully appreciated by those persons skilled in the art.

I claim:

1. In a security system of the class described for controlling the position of a closure member relatively to a stationary member, a bolt moveable between projected and retracted positions relatively to one of said members, bolt receiving and securing means mounted on the other of said members, releasable latch means releasing said bolt receiving means from said other of said members whereby the closure member is free to move relatively to the stationary member, and a chain attached at one end to said bolt receiving means and anchored at the other end to limit relative movement of said members.

2. A security system according to claim 1, wherein said bolt is mounted for projection and retraction in a door, said bolt receiving means is releasably mounted in a door jamb and said means releasing said bolt receiving means comprises a manually operable latch biased towards latching position.

3. A security system according to claim 1, wherein said bolt is rectilinear in configuration and said bolt receiving means is formed with a ramp and a recess, whereby said bolt is depressed by said ramp when said closure member is being closed, and extends into said recess when said closure member is in closed position.

4. A security system according to claim 3, wherein said bolt is equipped with a locking cam that secures said bolt and bolt receiving means against separation when said bolt is in fully projected position, and release means associated with said cam effecting release of said bolt receiving means from said bolt upon retraction of said bolt.

5. In a security system of the class described for controlling the position of a closure member relatively to a stationary member, a bolt moveable between projected and retracted positions relatively to one of said members, bolt receiving and securing means mounted on the other of said members, releasable latch means releasing said bolt receiving means from said other of said members whereby the closure member is free to move relatively to the stationary member, a chain attached at one end to said bolt receiving means and anchor means adapted to engage said chain at selected positions along its length to limit opening movement of said closure means.

6. A security system according to claim 5, wherein said anchor means is formed with a chain guide through which said chain may pass and a plurality of upstanding members adjacent the chain guide entrance through which said chain passes when said closure is opening, said upstanding members being positioned to engage selected links of said chain, when the latter is bent at the chain guide entrance, to anchor same and said closure against further movement in opening direction.

7. A security system according to claim 6, wherein said anchor means has four upstanding members positioned 90° apart around the aforesaid chain guide opening, wherefore said chain can be anchored against further movement through said anchor means by bending same in any direction at said opening.

8. In a security system of the class described for controlling the position of a closure member relatively to a stationary member, a bolt moveable between projected and retracted positions relatively to one of said members, bolt receiving and securing means mounted on the other of said members, releasable latch means releasing said bolt receiving means from said other of said members whereby the closure member is free to move relatively to the stationary member, a chain attached at one end to said bolt receiving means and anchored at the other end to limit relative movement of said members, a normally open circuit activating switch, and switch closing means effective to close said switch upon application of a force of predetermined magnitude to increase relative movement of said members beyond said limit.

9. In a security system of the class described for controlling the position of a closure member relatively to a stationary member, a bolt moveable between projected and retracted positions relatively to one of said members, bolt receiving and securing means mounted on the other of said members, releasable latch means releasing said bolt receiving means from said other of said members whereby the closure member is free to move relatively to the stationary member, a chain attached at one end to said bolt receiving means and anchor means adapted to engage said chain at selected positions along its length to limit opening movement of said closure means, a normally open circuit activating switch, and switch closing means effective to close said switch upon application of a force of predetermined magnitude to inrrease relative movement of said members beyond said limit.

10. In apparatus of the class described for controlling the position of a closure member relatively to a stationary member, a bolt mounted for reciprocating movement between projected and retracted position relatively to said closure member, means supporting said bolt for lateral movement upon the application of a predetermined lateral force to said bolt, means urging said bolt into projected position, and means for retracting said bolt, a normally open circuit activating switch, switch closing means effective to close said switch upon lateral movement of said bolt; bolt receiving and securing means mounted on the other of said members, releasable latch means releasing said bolt receiving means from said one of said members whereby the closure member is free to move relatively to the stationary member, and a chain attached at one end to said bolt receiving means and anchored at the other end to limit relative movement of said members and to effect lateral movement of said bolt to close said switch upon application of a predetermined force to said chain.

11. In apparatus of the class described for controlling the position of a closure member relatively to a stationary member, a bolt mounted for reciprocating movement between projected and retracted position relatively to said closure member, means supporting said bolt for lateral movement upon the application of a predetermined lateral force to said bolt, means urging said bolt into projected position, and means for retracting said bolt, a normally open circuit activating switch, switch closing means effective to close said switch upon lateral movement of said bolt; bolt receiving and securing means mounted on the other of said members, releasable latch means releasing said bolt receiving means from said other of said members whereby the closure member is free to move relatively to the stationary member, a chain attached at one end to said bolt and anchored at the other end to limit relative movement of said members and to effect lateral movement of said bolt to close said switch upon application of a predetermined force to said chain, and anchor means adapted to engage said chain at selected positions along its length to limit opening movement of said closure member.

12. A security system according to claim 11, wherein said anchor means is formed with a chain guide through which said chain may pass and a plurality of upstanding members adjacent the chain guide entrance through which said chain passes when said closure is opening, said upstanding members being positioned to engage selected links of said chain, when the latter is bent at the chain guide entrance, to anchor same and said closure against further movement in opening direction.

13. An apparatus of the class described having a member including a face plate, a bolt member mounted for reciprocating movement between projected and retracted positions relatively to said face plate, means for urging said bolt member into projected position, means for retracting said bolt member; a recess in said face plate, a second plate mounted in said recess, mounting means supporting said bolt member and said second plate for lateral movement relatively to said face plate upon the application of a predetermined lateral force to said bolt member, said mounting means including spring means bearing against the inner surface of said face plate and against studs extending through said face plate and engaging said second plate, a normal open circuit activating switch and switch closing means effective to close said switch upon lateral movement of said bolt member.

14. In apparatus of the class described for controlling the position of a closure member relatively to a stationary member, a face plate, a bolt mounted for reciprocating movement between the projected and retracted positions relatively to said face plate, means urging said bolt into projected position, means for retracting said bolt; a recess in said face plate, a second plate mounted in said recess, mounting means supporting said bolt and said second plate for lateral movement relatively to said face plate upon the application of a predetermined lateral force to said bolt, said mounting means including spring means bearing against the inner surface of said face plate and against studs extending through said face plate and engaging said second plate, a normally opened circuit activating switch, switch closing means effective to close said switch upon lateral movement of said bolt, and a chain releasably attached at one end to said second plate and connected to anchor means at the other end to effect lateral movement of said second plate upon application of a predetermined force to said chain thus to activate said switch closing means.

15. A security system according to claim 14 wherein said bolt is equipped with a locking cam that secures said bolt and bolt receiving means against separation when said bolt is in fully projected position, and release means associated with said cam effecting release of said bolt receiving means from said bolt upon retraction of said bolt.

16. Apparatus according to claim 14, wherein said anchor is adapted to engage said chain at selected positions along its length to limit opening movement of said closure member.

17. A security system according to claim 16, wherein said anchor means is formed with a chain guide through which said chain may pass and a plurality of upstanding members adjacent the chain guide entrance through which said chain passes when said closure is opening, said upstanding members being positioned to engage selected links of said chain, when the latter is bent at the chain guide entrance, to anchor same and said closure against further movement in opening direction.

18. A chain lock device for limiting the degree of movement of a closure member with respect to a stationary member, comprising a link chain secured at one end to one of said members, an anchor plate secured to the other member and extending in a vertical direction, an aperture in said anchor plate which closely accommodates said chain for movement in one direction therethrough, and a pair of lug-like projections extending outwardly from said anchor plate on the side thereof opposite from said one end of said chain, said projections being shaped and positioned adjacent opposite sides of said aperture toward the bottom thereof whereby the freely hanging opposite end of said chain will automatically latch itself to said anchor plate against movement in the opposite direction.

References Cited

UNITED STATES PATENTS

| | | | |
|---|---|---|---|
| 16,676 | 2/1857 | Adams | 292—340 |
| 275,287 | 4/1883 | Taylor | 70—210 |
| 1,531,269 | 3/1925 | Biddle | 70—211 |
| 2,350,306 | 5/1944 | Spain | 70—418 |
| 2,547,108 | 4/1951 | Anderson | 292—150 X |
| 2,790,663 | 4/1957 | Sarver | 292—264 |
| 2,818,475 | 12/1957 | Harry | 200—61.64 |
| 2,946,213 | 7/1960 | Reiner | 292—264 X |
| 1,789,492 | 1/1931 | Nisbett et al. | 292—264 X |

RICHARD E. MOORE, Primary Examiner

U.S. Cl. X.R.

292—169, 264